(12) United States Patent
Hanzawa et al.

(10) Patent No.: US 6,413,640 B1
(45) Date of Patent: Jul. 2, 2002

(54) CARBON FIBER COMPOSITE MATERIALS

(75) Inventors: Shigeru Hanzawa, Kagamigahara; Kenji Nakano, Tokai, both of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/499,004

(22) Filed: Feb. 4, 2000

(30) Foreign Application Priority Data

Feb. 9, 1999 (JP) .............................. 11-031979
Nov. 4, 1999 (JP) .............................. 11-313788
Jan. 12, 2000 (JP) ............................. 2000-003499

(51) Int. Cl.[7] .............................................. B32B 9/00
(52) U.S. Cl. ..................... 428/408; 428/409; 428/688; 428/689; 428/293.1; 428/293.4
(58) Field of Search ................. 428/408, 409, 428/688, 689, 898, 293.4, 293.1, 293.7

(56) References Cited

FOREIGN PATENT DOCUMENTS

| EP | 1 028 099 A1 | 8/2000 |
|---|---|---|
| GB | 1 457 757 | 12/1976 |
| WO | WO 99/19273 | 4/1999 |

*Primary Examiner*—Deborah Jones
*Assistant Examiner*—Abraham Bahta
(74) *Attorney, Agent, or Firm*—Burr & Brown (57) ABSTRACT

Provided are carbon fiber composite materials which have a structure including a skeletal part and a matrix formed integrally around the skeletal part. The skeletal part is mainly composed of carbon fiber bundles and silicon carbide and metallic silicon formed in the carbon fiber bundles and/or on the outer surface of the carbon fiber bundles. The matrix is mainly composed of silicon carbide and metallic silicon. Alternatively, the carbon fiber composite materials have a structure including a skeletal part and a matrix formed integrally around the skeletal part and have a porosity of 0.5–5% and a two-peak type distribution of average pore diameter. The skeletal part is formed of carbon fibers and a carbon component other than the carbon fibers and/or silicon carbide, and the matrix being formed of silicon carbide at least 50% of which is of β type. These carbon fiber composite materials are suitable for the uses as aerospace materials.

8 Claims, 5 Drawing Sheets

CARBON FIBER COMPOSITE MATERIALS

BACKGROUND OF THE INVENTION AND RELATED ART

1. Field of the Invention

The present invention relates to carbon fiber composite materials suitably usable for aerospace materials, and, more particularly, to carbon fiber composite materials less in mass reduction caused by atomic oxygen and excellent in endurance.

2. Related Art Statement

Recently, many artificial satellites are launched depending on their purposes, such as for communication, defense, meteorological observation, etc. and they become essential for human life. Many of these artificial satellites are launched and injected into earth orbits of low height (200–700 km from earth).

Furthermore, shuttle spacecrafts represented by the space shuttle have been steadily developed, and traffic service on a commercial base in the near future of several years from now has already been planned. As one of the representative structural materials in the field of aerospace, carbon materials such as graphite and C/C composites comprising carbon fibers and carbon powders have been widely used and they have been studied and developed.

It is known that space structures remaining in earth orbits of low height are subjected to the influence of atomic oxygen which is a main component of the atmosphere. For example, collision of atomic oxygen with the above-mentioned carbon materials causes mass reduction of the materials, resulting in deterioration of mechanical strength. This problem is serious especially in missions of long periods. On the other hand, even in the case of shuttle spacecrafts which revolve in the low height earth orbits for only a short period, it is naturally preferred to use materials which hardly undergo deterioration such as mass reduction.

SUMMARY OF THE INVENTION

The object of the present invention is to provide carbon fiber composite materials suitably usable as new aerospace materials which are much smaller in mass reduction caused by atomic oxygen and superior in endurance as compared with conventional graphite or C/C composites.

That is, the present invention provides, as the first materials, carbon fiber composite materials, characterized by being used as aerospace materials and comprising a skeletal part and a matrix integrally formed around the skeletal part, said skeletal part being mainly composed of carbon fiber bundles and silicon carbide and metallic silicon formed in the carbon fiber bundles and/or on the outer surface of the carbon fiber bundles and said matrix being mainly composed of silicon carbide and metallic silicon.

The first carbon fiber composite materials may contain a carbon component other than carbon fibers in the carbon fiber bundles. Furthermore, there may be also suitably used those which have such a composition that the content of the metallic silicon has a gradient of increasing from inside of the skeletal part toward the outer surface of the skeletal part, and/or from the outer surface of the skeletal part toward the outer surface of the matrix, and/or from the outer surface of the matrix toward inside of the matrix. Such materials can be obtained by arranging in nearly parallel with each other a plurality of yarns each of which comprises a bundle mainly composed of carbon fibers and a resin coated on the outer surface of the bundle, forming them into a sheet, laminating a plurality of the sheets in the form of multi-layer, heat-treating the laminate in a non-oxidizing atmosphere, and impregnating with metallic silicon to form integrally a skeletal part and a matrix.

Next, the present invention also provides, as the second materials, carbon fiber composite materials, characterized by being used as aerospace materials and comprising a skeletal part and a matrix integrally formed around the skeletal part with a porosity of 0.5–5% and a two-peak type distribution of average pore diameter, said skeletal part being formed of carbon fibers and a carbon component other than carbon fibers and/or silicon carbide, said matrix being formed of silicon carbide at least 50% of which is of β type.

In the second carbon fiber materials, the matrix is preferably formed along the surface of the skeletal part, and furthermore the matrix is also preferred to have such an inclined composition of the content of silicon increasing in proportion to the distance from the surface of the skeletal part. Moreover, the matrix preferably forms a continuous three-dimensional network structure.

On the other hand, the skeletal part preferably comprises a laminate obtained by two-dimensionally arranging at least a plurality of preformed yarns comprising carbon fibers and a carbon component other than carbon fibers in nearly parallel with each other thereby obtaining sheets and laminating a desired number of the sheets so that the longer directions of the preformed yarns alternately cross at right angles.

In the above-mentioned first and second carbon fiber composite materials, it is also preferred that a silicon carbide film is formed on the surface.

DETAILED DESCRIPTION OF THE PREFERRED EMBODIMENTS

The embodiments of the present invention will be explained below referring to the drawings. The present invention is never limited to these embodiments.

The first carbon fiber composite material of the present invention mainly comprises a skeletal part and a matrix formed around the skeletal part. The skeletal part and the matrix are formed integrally with each other, and naturally they have a continuous form. However, in the present invention, the composite material is divided into the skeletal part and the matrix, taking into consideration the materials used when the suitable production method mentioned later is employed and the stages for forming each part in processing steps, and taking into account that the carbon fiber composite material of the present invention can be easily explained by dividing it into the skeletal part and the matrix.

The skeletal part mainly comprises carbon fiber bundles and silicon carbide (SiC) and metallic silicon (metallic Si) formed in the carbon fiber bundles and/or on the outer surface of the carbon fiber bundles. As the carbon fibers, there may be suitably used pitch carbon fibers made from petroleum pitch or coal tar pitch and PAN carbon fibers made from acrylonitrile fibers. These carbon fibers used preferably have a fiber diameter of about 10 $\mu$m, and, preferably, several hundred to several ten thousand of these carbon fibers are bundled to make a fiber bundle.

For binding these carbon fibers into a bundle, a powdery binder, pitch, carbon, coke or the like is contained in the bundled carbon fibers and, if necessary, a phenolic resin powder or the like is contained, and, if further necessary, a binder (which means binder, pitch, carbon, coke, phenolic resin powder or the like) is applied to the surface of the bundled carbon fibers, thereby to form a carbon fiber bundle, and then a flexible film comprising a plastic such as thermoplastic resin is formed on the outer surface of the bundle. That is, it is also preferred that the carbon fiber bundle contains a carbon component other than carbon fibers. The thus obtained flexible carbon fiber bundle is hereinafter referred to as "preformed yarn".

SiC or metallic Si in the skeletal part can be produced by further molding the preformed yarns into a given shape, then heat-treating (firing) in a non-oxidizing atmosphere so that the binder and others contained in the preformed yarns remain as carbon components, and impregnating the yarns with molten metallic Si.

Molding of the preformed yarns can be carried out, for example, by arranging the preformed yarns in nearly parallel with each other, laminating the layers of the preformed yarns so that the longer directions of the fibers in the respective layers cross at right angles or laminating the layers of the preformed yarns which are previously knitted crosswise and molded into sheets, and molding the laminate by hot press or the like. Alternatively, the preformed yarns can be packed in a mold of a given shape and subjected to press molding. In this case, it is also preferred to fill a thermoplastic resin such as phenolic resin or epoxy resin and tar or pitch between the preformed yarns or between layers laminated.

The carbon produced by the heat treatment in a non-oxidizing atmosphere is preferably in the form of graphitized carbon powders, and the graphitization can be performed by controlling the heat-treating conditions. Molten metallic SiC chemically reacts with carbon to produce SiC, and the metallic Si remains between the produced SiC or between carbon fibers. Thus, the skeletal part has such a structure that it is mainly composed of carbon fiber bundles and Si component (which means the whole compounds containing Si as a constituting element) is present inside the carbon fiber bundles and on the surface of the carbon fiber bundles.

However, usually, it is difficult to impregnate the carbon fiber bundles with metallic Si up to deep inner portion, and hence the metallic Si is present mainly in the vicinity of the surface of the carbon fiber bundles, whereby structure and chemical and mechanical characteristics of the carbon fiber bundles are retained. Metallic Si is also a component of the matrix and, therefore, is continuously present through the skeletal part and the matrix.

The carbon fiber bundle formed by firing the preformed yarn in a non-oxidizing atmosphere and impregnating with metallic Si and including a phase mainly composed of SiC formed through carbonization of the resin film is hereinafter referred to as "yarn". Accordingly, the skeletal part in the carbon fiber composite material of the present invention comprises the yarns.

The matrix of the first carbon fiber composite material of the present invention is mainly composed of SiC and metallic Si. As mentioned above, when preformed yarns molded into a given shape are fired in a non-oxidizing atmosphere and then impregnated with metallic Si, a matrix is formed in such a structure that the spaces between yarns are filled with much metallic Si and the spaces between yarns become continuous. In this case, carbon and metallic Si present between the yarns react to form also SiC. Therefore, the proportion of metallic Si and SiC in the matrix varies depending on the state of arrangement in molding of the preformed yarns and the kind and amount of the binder or the like filled between the preformed yarns.

The first carbon fiber composite material of the present invention having the above-mentioned skeletal part and matrix is hereinafter referred to as "Si—C/C", and examples of the Si—C/C will be explained in more detail referring to FIG. 1–FIG. 3.

Figure 1:
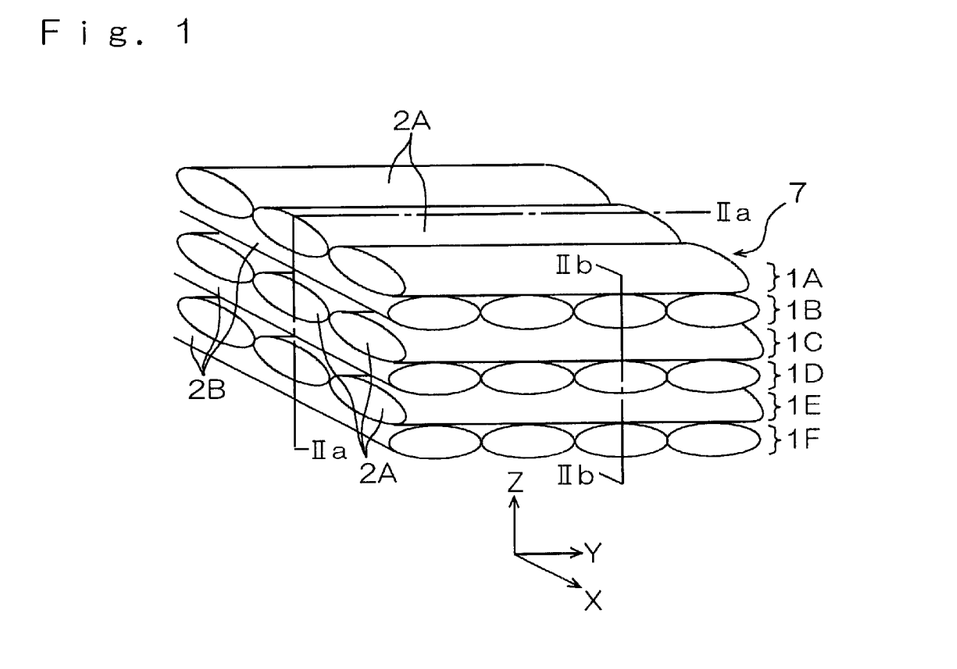
FIG. 1 is an oblique view which shows one example of arrangement of carbon fiber bundles in the carbon fiber composite material of the present invention.

FIG. 1 is an oblique view showing one embodiment of Si—C/C7 and shows one form of arrangement of yarns 2A. 2B, namely, a structure of the skeletal part of Si—C/C7. Therefore, in order to clearly disclose the state of arrangement of yarns 2A· 2B, metallic Si and others which constitute the matrix are not described in FIG. 1. Naturally, the state of arrangement of yarns 2A· 2B is the same as the state of arrangement of preformed yarns in making a molded body using the preformed yarns.

In FIG. 1, Si—C/C7 has such a structure that sheets 1B· 1D· 1F comprising a plurality of yarns 2B which are arranged in nearly parallel with each other and of which fiber length directions are in nearly parallel with X-axis direction of a three-dimensional rectangular coordinates and sheets 1A· 1C· 1E comprising a plurality of yarns 2A which are arranged in nearly parallel with each other and of which fiber length directions are in nearly parallel with Y-axis direction are alternately laminated in vertical direction which is Z-axis direction.

Figures 2A, 2B:
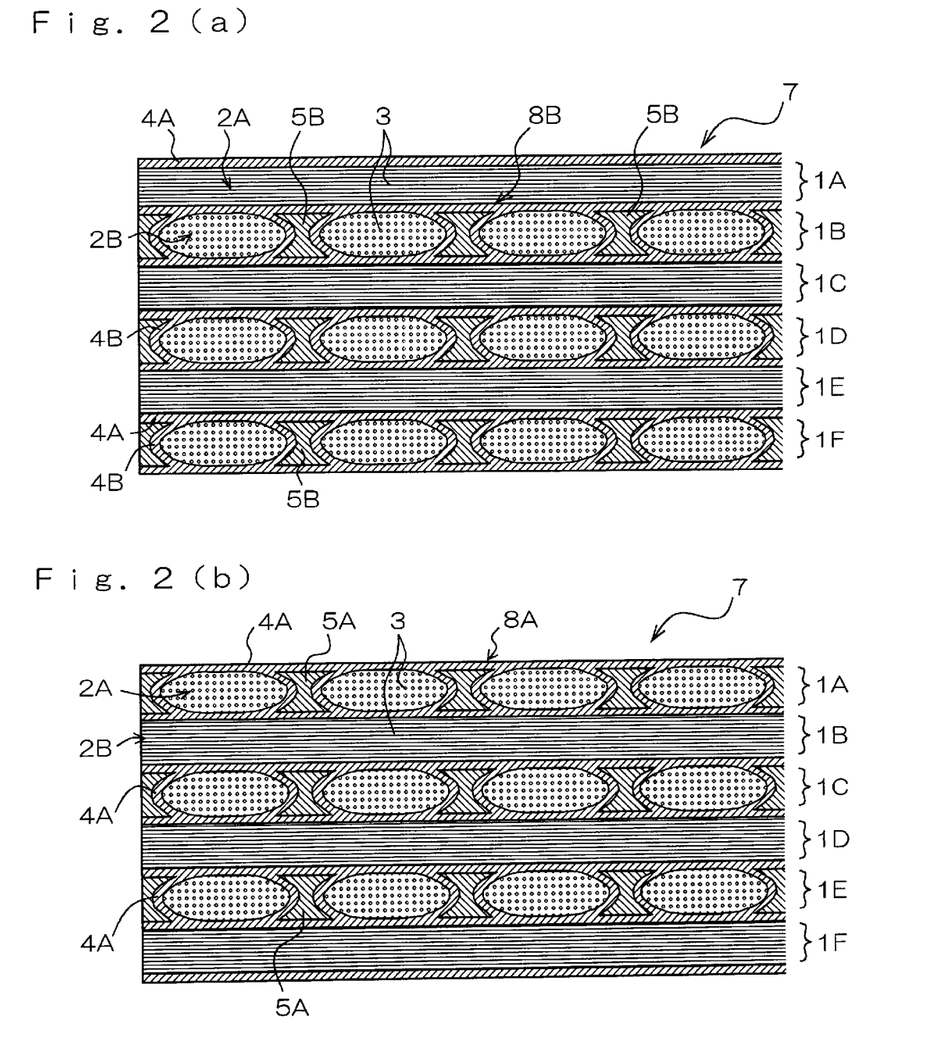
FIG. 2(a) is a cross-sectional view taken along the line IIa—IIa of FIG. 1.
FIG. 2(b) is a cross-sectional view taken along the line IIb—IIb of FIG. 1.

FIG. 2(a) is a cross-sectional view taken along the line IIa—IIa of FIG. 1, and FIG. 2(b) is a cross-sectional view taken along the line IIb—IIb of FIG. 1. As shown in FIGS. 2(a) and 2(b), a skeletal part in the form of three dimensional lattice mainly composed of 2A· 2B is formed by laminating sheets 1A–1F. Since sheets 1A–1F are pressed in the direction of lamination in molding of the preformed yarns, the cross-section of the yarns 2A· 2B formed is of nearly flatted elliptical shape.

Figure 3:
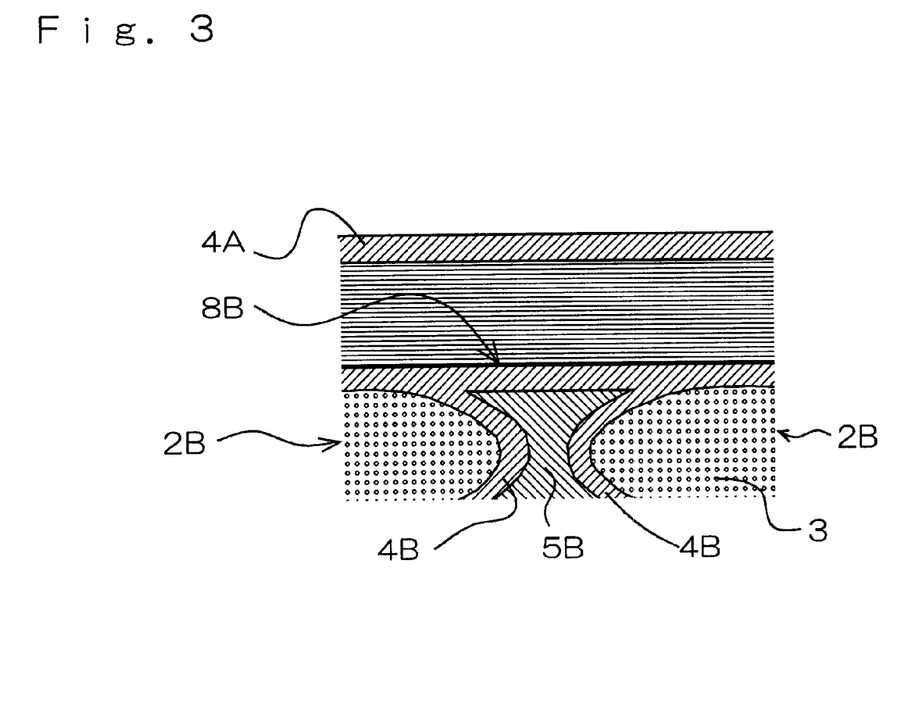
FIG. 3 is a partial enlargement of FIG. 2(a).

FIG. 3 is a partial enlargement of FIG. 2(a). In sheets 1A· 1C· 1E, matrix 8A is formed in the space between adjacent yarns 2A, and matrix 8A extends along the surface of yarn 2A in Y-axis direction in parallel with the surface of yarn 2A. On the other hand, in sheets 1B· 1D· 1F, matrix 8B is formed in the space between adjacent yarns 2B, and matrix 8B extends along the surface of yarn 2B in X-axis direction in parallel with the surface of yarn 2B.

Matrices 8A· 8B are mainly composed of metallic Si—SiC composite phases 5A· 5B which are less in carbon content than SiC phases 4A· 4B which are surface phases of yarns 2A· 2B. The boundary between the SiC phases 4A· 4B and the metallic Si—SiC composite phases 5A· 5B is not necessarily clear as shown in FIG. 3, and is not needed to be clear and is variable depending on the surface properties of resin film of the preformed yarns. The proportion of metallic Si and SiC present in matrices 8A· 8B can be varied by the material filled between the preformed yarns in molding of them.

Matrices 8A·8B extend along the surface of yarns 2A·2B narrowly, preferably linearly and cross at right angles with each other. Matrix 8A in sheets 1A·1C·1E and matrix 8B in sheets 1B·1D·1F which cross at right angles with the sheets 1A·1C·1E are respectively connected at the space between yarn 2A and yarn 2B. As a result, in Si—C/C7, matrices 8A·8B form a three-dimensional lattice as a whole.

SiC phases 4A·4B are mainly phases formed by the reaction of the resin film of the preformed yarns with active carbon produced and form a skeletal part of Si—C/C7 together with carbon fiber bundles 3. As can be easily supposed from the production method of Si—C/C mentioned hereinafter, the SiC phases 4A·4B may partially contain metallic Si. Furthermore, in this example, SiC phases 4A·4B are also formed between yarns 2A·2B which are adjacent to each other in upward and downward direction.

A suitable method for producing such Si—C/C7 is as follows. First, a give amount of metallic Si is put on a molded body (laminate) comprising the preformed yarns, followed by keeping it at a temperature of 1100–1400° C. which is lower than the melting point of metallic Si in a non-oxidizing atmosphere such as inert gas to carbonize resin film or binder of the preformed yarns.

Then, temperature of the laminate is raised to 1450–2500° C. to melt the metallic Si. Thus, metallic Si is impregnated into the spaces between carbon fiber bundles 3 after the preformed yarns are burnt, and at this time, carbon produced from the resin film and binder of the preformed yarns and carbon produced from the resin filled between the preformed yarns react with the molten metallic Si to produce SiC. That is, yarns comprising carbon fiber bundles, SiC and metallic Si are formed from the preformed yarns, and, simultaneously, these yarns constitute the skeletal part. At the same time, the matrix mainly composed of SiC and metallic Si is formed by impregnation with metallic Si. Thus, the Si—C/C7 can be obtained.

It is also possible to fire the molded body such as laminate alone in a non-oxidizing atmosphere, thereby obtaining a sintered body subjected to carbonization treatment and then put metallic Si on the sintered body to perform impregnation treatment with the metallic Si. The above-mentioned method for the production of Si—C/C is merely an example and can be variously modified as far as each of the steps is not deviated from its purpose.

As mentioned above, by combining the carbonizing step of the preformed yarns having the resin film around the yarns with the impregnation step with metallic Si, the resin film of the yarns is carbonized to leave long and narrow open pores in the spaces between the carbon fiber bundles, and the metallic Si penetrates into the inner part of the laminate along the open pores. During this penetration step, the metallic Si begins to react with the carbon produced from the resin film of the preformed yarns, and, hence, carbonization reaction gradually takes place from the surface side of the carbon fiber bundles to form SiC.

That is, the molten metallic Si of high temperature first contacts and reacts with carbon of high activity produced upon heat decomposition of the resin film or the organic binders added to the carbon fiber bundles to produce SiC while it can hardly directly contact with the carbon fibers and, as a result, the carbon fiber bundles and the structure of the carbon fibers are hardly broken. In this way, mechanical strength of the carbon fiber can be assured.

It can be easily supposed from the above-mentioned production steps of Si—C/C that the matrix can contain some intermediate phases between a phase in which metallic Si remains nearly purely and a nearly pure SiC phase. Furthermore, considering the step of impregnation of metallic Si into the skeletal part, it is also supposed that portions differing in content of metallic Si or SiC are present also in the skeletal part.

That is, the skeletal part and the matrix can have layers changing in composition in such an inclined manner that the content of metallic Si increases from the inner portion toward the outer surface of the skeletal part, and/or increases from the outer surface of the skeletal part toward the outer surface of the matrix, and/or increases from the outer surface of the matrix toward the inner portion of the matrix. Presence of such layers inclined in composition exhibits the effect to relax the stress based on the thermal characteristics of the constituting materials and is preferred for the material characteristics.

Next, reactivity with atomic oxygen which is an important characteristic when the Si—C/C is used as aerospace materials will be explained. The aerospace materials are specifically structural materials used for space structures such as artificial satellites, rockets, spacecrafts, and space stations.

Figure 4:
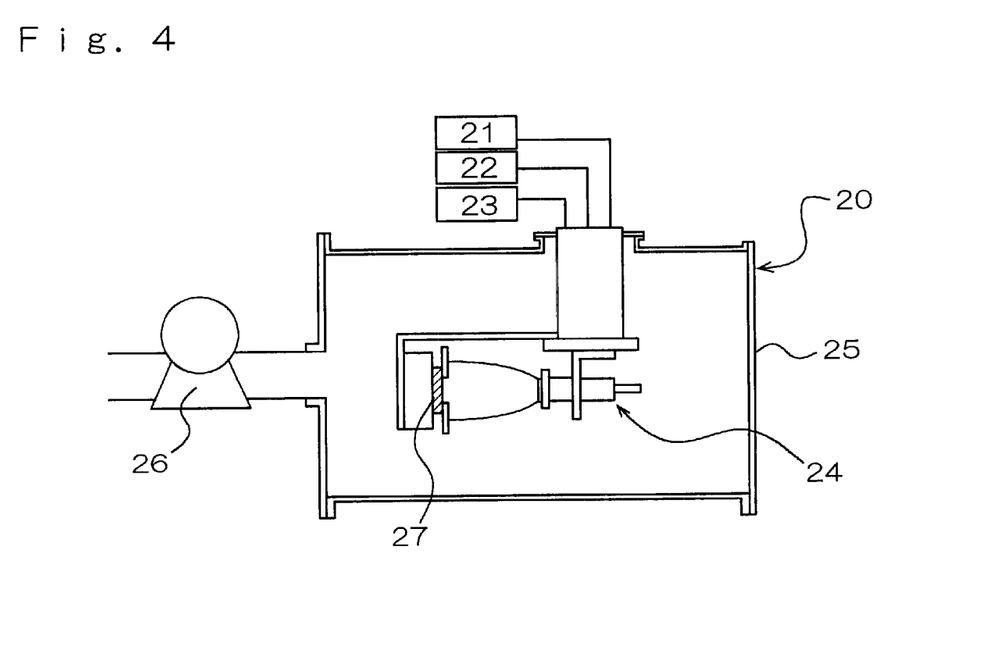
FIG. 4 explains the construction of a test apparatus.

FIG. 4 shows construction of a test apparatus 20 which tests the reactivity of Si—C/C with atomic oxygen. The inside of chamber 25 can be in the state of a given reduced pressure using vacuum pump 26, and in the chamber there is provided an atomic oxygen generating device 24 which is connected to gas supply device 21, voltage device 22 and cooling device 23.

Figure 5:
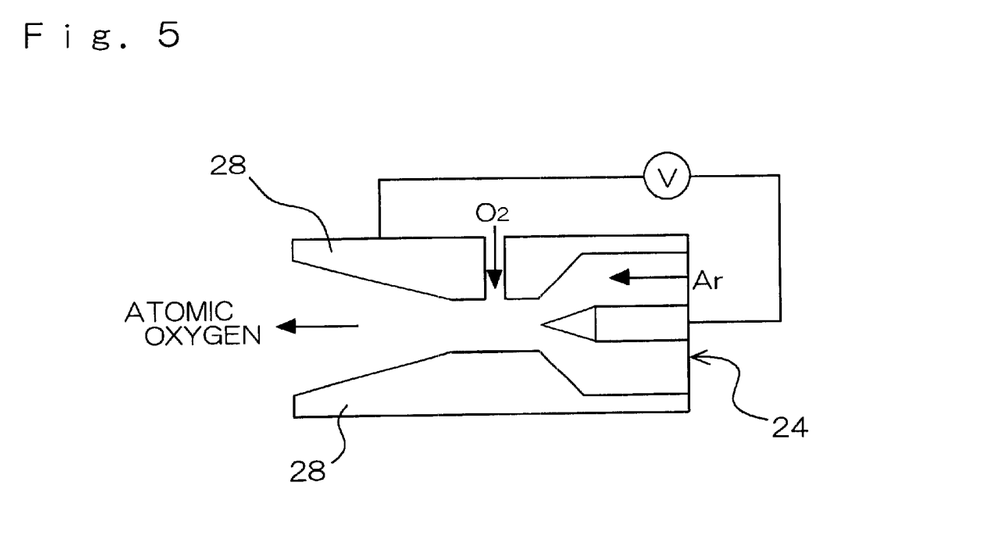
FIG. 5 explains the construction of an apparatus for generation of atomic oxygen.

As the atomic oxygen generating device 24, a DC arc jet as shown in FIG. 5 is used. In the DC arc jet, argon (Ar) gas is used as a working fluid, and oxygen ($O_2$) gas smaller in the amount than the Ar gas is introduced from downstream side of discharging part raised in temperature by arc discharge, thereby heat-dissociating the $O_2$ gas into atomic state. The thus produced atomic oxygen is accelerated by nozzle 28 together with Ar gas and test specimen 27 is irradiated with the atomic oxygen.

Assuming that all of the introduced $O_2$ gas has been dissociated into atomic state, flux of the atomic oxygen irradiated to the test piece is $1.4 \times 10^{20}$ atms/cm$^{-2}$/s. The irradiation rate is calculated from the thrust of the arc jet measured, and is about 2.1±0.4 km/s. Therefore, collision energy in this case is 0.38±0.14 eV.

As the test piece, were used the Si—C/C (density: 2.0 g/cm$^3$) of the present invention, and, for comparison, commercially available isotropic high-density graphite (density: 1.82 g/cm$^3$) and C/C composite (density: 1.70 g/cm$^3$). Test temperature was 310 K and 345 K, irradiation time of the atomic oxygen was 20–40 minutes, and loss of mass of the specimen after irradiation was considered to be caused by the atomic oxygen.

Figure 6:
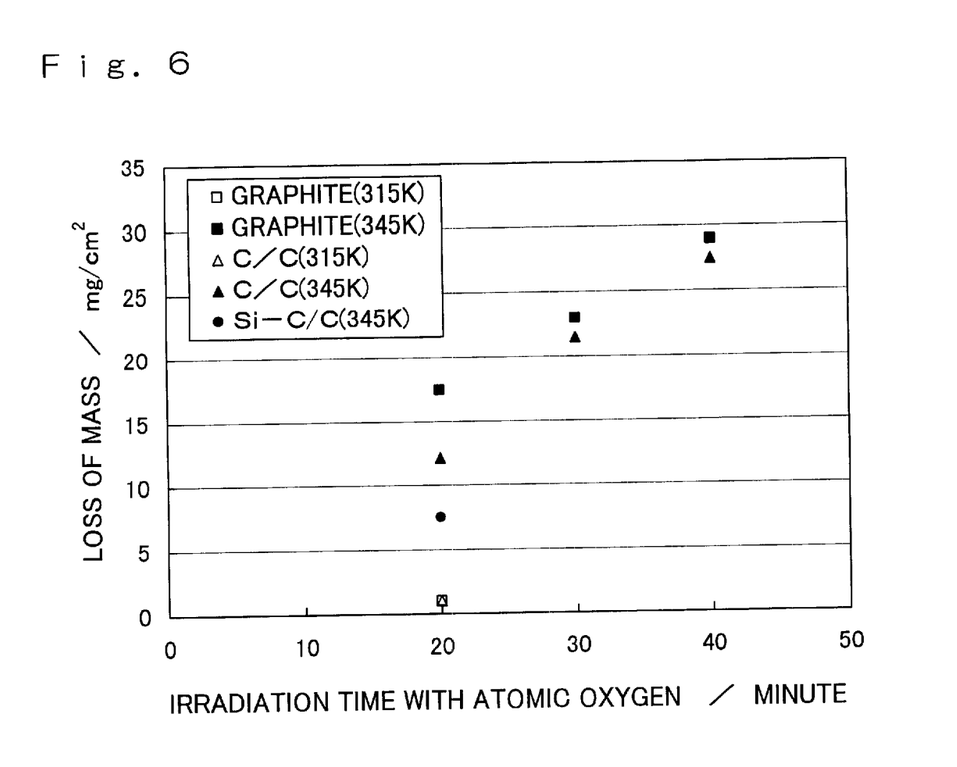
FIG. 6 is a graph which shows loss of mass of a test specimen caused by atomic oxygen.

FIG. 6 shows relation between the irradiation time of the atomic oxygen and the loss of mass. It is clear that substantially no loss of mass occurred for both the graphite and C/C at a temperature of 315 K. In FIG. 6, the plots overlapped at 315 K.

On the other hand, when the test temperature was 345 K, graphite showed a loss of mass of about 17.5% and C/C showed about 12% with the irradiation time of 20 minutes, and with increase of the irradiation time, reduction of mass occurred nearly linearly. In the case of Si—C/C, the loss of mass after irradiation for 20 minutes was small, namely, about 7%, and thus Si—C/C showed extremely better resistance to atomic oxygen than graphite and C/C. As for Si—C/C, no test was conducted at 315 K, but it can be considered from the test result at 345 K that loss of mass will not occur at 315 K also for Si—C/C.

The loss of mass in the above-mentioned test is considered to be due to oxidation of the materials, and thus it is considered that the better aerospace materials can be obtained by using materials higher in oxidation resistance. From this viewpoint, the present invention provides the second carbon fiber composite material as explained below.

The second carbon fiber composite material also has a structure comprising a skeletal part and a matrix formed integrally around the skeletal part. The skeletal part is formed of carbon fibers and a carbon component other than carbon fibers and/or SiC. On the other hand, the matrix comprises SiC, and at least 50% of the SiC is of β type. Furthermore, the second carbon fiber composite material has a porosity of 0.5–5% and a two-peak type distribution of average pore diameter.

The second carbon fiber composite material having the above characteristics can be obtained by carrying out the heat treatment to such an extent that the metallic Si present in the first carbon fiber composite material disappears. Therefore, the second carbon fiber composite material is hereinafter referred to as "SiC—C/C".

Accordingly, materials and method for the production of SiC—C/C are basically the same as in the production of the first carbon fiber composite material, and the matrix is usually formed along the surface of the skeletal part. Furthermore, a matrix of continuous three-dimensional network structure is formed in SiC—C/C produced using a laminate which is formed by alternately laminating sheets comprising preformed yarns arranged in parallel with each other in such a manner that the longer directions of the preformed yarns in the alternate sheets cross at right angles.

Moreover, the matrix of SiC—C/C can contain some different phases from SiC-based phase comprising carbon containing a very small amount of silicon bonded thereto to a pure SiC phase. However, the matrix contains metallic Si in an amount of only 0.3% by weight or less which is a limit of detection by X-ray. That is, the matrix typically comprises SiC phase, but this SiC phase can contain SiC-based phase in which content of silicon changes in inclined manner.

As explained above, SiC—C/C has the structure in which the matrix mainly composed of SiC phase is formed between the yarns which form the skeletal part, namely, has the structure of the surface of the yarns being strengthened by the SiC phase or the SiC-based phase. Furthermore, as explained hereinafter as to the method for the production of SiC—C/C, pores of relatively large pore diameter of about 100 μm as a median are formed in the central portion of the matrix. Therefore, the stress applied to SiC—C/C is scattered by this pore portion to give excellent mechanical strength and impact resistance.

Moreover, SiC—C/C contains substantially no metallic Si, and, hence, shows oxidation resistance superior to that of the above-mentioned Si—C/C and thus is more preferred as aerospace materials. SiC—C/C may contain at least one material selected from the group consisting of boron nitride, boron, copper, bismuth, titanium, chromium, tungsten and molybdenum, and these materials are preferably supplied as being contained in the carbon fiber bundles.

Next, method for production of SiC—C/C will be explained. As in the case of production of Si—C/C mentioned above, various molded bodies such as laminates formed of preformed yarns are prepared and fired in a non-oxidizing atmosphere to obtain sintered bodies subjected to carbonization treatment. Then, temperature of the sintered bodies is raised to 1450–2500° C., preferably 1700–1800° C. to melt metallic Si and impregnate the molten metallic Si into open pores of the sintered bodies. The thus obtained samples may be Si—C/C containing a large amount of metallic Si or ones containing only a slight amount of metallic Si depending on the impregnation temperature and time of the metallic Si. The impregnation treatment with metallic Si is preferably carried out under a firing furnace inner pressure in the range of 0.1–10 hPa.

Then, by once reducing the temperature inside the furnace to about room temperature or increasing the inner pressure to about 1 atm. with keeping the temperature as it is and raising the temperature inside the furnace to 2000–2800° C., preferably 2100–2500° C. to diffuse metallic Si which may remain depending on the impregnation conditions and SiC which has been produced into carbon fibers and other carbon component than the carbon fibers and react the metallic Si and SiC with these carbons. It has been confirmed by comparison of X-ray diffraction intensity that at least 50% of the SiC phase becomes β type by this heat treatment.

In this way, SiC-based phase is formed and simultaneously pores of relatively large pore diameter of about 100 μmφ are formed inside the matrix from which metallic Si has escaped. The pores are formed at the positions of the composite phases 5A· 5B in FIG. 2. About 1 hour is sufficient for this treatment, and the sample can be made to a state of no metallic Si being present by this heating treatment at high temperature and under normal pressure.

Since the aforementioned heating treatment under reduced pressure produces pores of relatively small pore diameter and, on the other hand, the heating treatment at high temperature and under normal pressure produces pores of relatively large pore diameter, two kinds of pores are formed in the matrix of SiC—C/C. That is, the SiC—C/C has the feature that the pore diameter has a two-peak type distribution, and porosity is about 0.5–5% though it depends on the form of the preformed yarns used.

The carbon fiber composite materials have been explained hereabove, and when these materials are subjected to working such as cutting or grinding, the composition of the portion exposed at the surface may sometimes differ depending on the working direction and working depth. In order to further enhance oxidation resistance of such worked articles, it is preferred in the present invention to form an SiC film on the surface of the above-mentioned Si—C/C and SiC—C/C, suitably on the surface of the worked articles. Such SiC film can be formed by chemical vapor deposition methods such as CVD and CVI, slurry coating method or the like.

As mentioned above, the carbon fiber composite materials of the present invention are superior in oxidation resistance and very small in weight reduction caused by atomic oxygen and show excellent endurance. Furthermore, they have a gravity nearly the same as graphite or C/C. Therefore, they can be suitably used as aerospace materials, for example, structural materials for space structures such as artificial satellites, rockets, spacecrafts and space stations, whereby life of space structures can be prolonged.

What is claimed is:

1. A carbon fiber composite material which has a structure comprising a skeletal part and a matrix formed integrally around the skeletal part, said skeletal part being mainly composed of carbon fiber bundles and silicon carbide and metallic silicon formed in the carbon fiber bundles and/or on the outer surface of the carbon fiber bundles and said matrix being mainly composed of silicon carbide and metallic silicon, wherein the content of metallic silicon increases in an inclined manner from inside of the skeletal part toward the outer surface of the skeletal part, and/or from the outer surface of the skeletal part toward the outer surface of the matrix, and/or from the outer surface of the matrix toward the inside of the matrix.

2. A carbon fiber composite material which has a structure comprising a skeletal part and a matrix formed integrally around the skeletal part, said skeletal part being mainly composed of carbon fiber bundles and silicon carbide and metallic silicon formed in the carbon fiber bundles and/or on the outer surface of the carbon fiber bundles and said matrix being mainly composed of silicon carbide and metallic silicon, said material being formed by laminating a plurality of sheets each of which comprises a plurality of preformed yarns arranged in nearly parallel with one another, said preformed yarns comprising bundles mainly composed of carbon fibers and a resin covering the outer surface of the bundles, heat-treating the laminate in a non-oxidizing atmosphere, and impregnating the laminate with metallic silicon to form integrally the skeletal part and the matrix.

3. A carbon fiber composite material which has a structure comprising a skeletal part and a matrix formed integrally around the skeletal part and has a porosity of 0.5–5% and a two-peak type distribution of average pore diameter, said skeletal part being formed of carbon fibers and a carbon component other than the carbon fibers and/or silicon carbide, and said matrix being formed of silicon carbide at least 50% of which is of $\beta$ type.

4. A carbon fiber composite material according to claim 3, wherein the matrix is formed along the surface of the skeletal part.

5. A carbon fiber composite material according to claim 3, wherein the matrix has such an inclined composition as the silicon content increasing in proportion to the distance from the surface of the skeletal part.

6. A carbon fiber composite material according to claim 3, wherein the matrix has a continuous three-dimensional network structure.

7. A carbon fiber composite material according to claim 3, wherein the skeletal part comprises a laminate formed by laminating sheets each of which comprises a plurality of preformed yarns arranged in nearly parallel with each other and comprising carbon fibers and a carbon component other than carbon fibers in such a manner that the longer directions of the preformed yarns alternately cross at right angles.

8. A carbon fiber composite material according to claim 3, which is an aerospace material.

* * * * *